May 16, 1944.  J. C. GIBBS  2,349,037
MACHINE FOR MAKING CLOSURE CAPS
Filed March 14, 1940   9 Sheets-Sheet 7

INVENTOR
John C. Gibbs
BY
Norman Holland
ATTORNEY

May 16, 1944.  J. C. GIBBS  2,349,037
MACHINE FOR MAKING CLOSURE CAPS
Filed March 14, 1940  9 Sheets-Sheet 8

Fig. 10

INVENTOR
John C. Gibbs
BY
Norman Holland
ATTORNEY

Patented May 16, 1944

2,349,037

UNITED STATES PATENT OFFICE 2,349,037

MACHINE FOR MAKING CLOSURE CAPS

John C. Gibbs, Brooklyn, N. Y., assignor to Anchor Cap & Closure Corporation, Long Island City, N. Y., a corporation of New York Application March 14, 1940, Serial No. 323,924

23 Claims. (Cl. 153—2)

The present invention relates generally to machines for the manufacture of articles such as closure caps and more particularly to machines for forming accurate thread constructions or container engaging means therein by utilizing dies.

The usual practice in making closure caps of the screw type is to roll or spin the threads or other container engaging means in the caps. Such machines and the tools therefor are illustrated in my prior Patent No. 2,010,228, granted August 6, 1935, where a solid threaded chuck smaller than the inside of a closure cap is inserted in the closure blank and thereafter moved with the closure blank into operative relation with a rolled or other suitable threaded surface to roll a thread or other container engaging means into the skirt. It is customary at the time of rolling the thread to form an outwardly rolled beaded edge at the bottom of the blank. These machine operations are rapid and upon cursory inspection the closures appear to be satisfactory. However, accurate measurements of the thread formed will show that it is not accurate and that the threads vary in different caps. Such a rolling operation has inherent limitations as to accuracy and as to lengths of the thread which can be rolled with reasonable accuracy.

The present invention overcomes the above and other difficulties by forming a thread or other container engaging means in the skirt of the cap with dies, whereby the threads will be the same in all of the caps and their accuracy astoundingly correct. Such caps go on a container and come off much more easily than closures with rolled threads. The bead on the bottom of the closure may be curled inwardly, which is not practical in rolling operations and which improves the appearance of the finished closure. Further features of the invention are the speed of operation, the simplicity of the tools and the support of the skirt of the cap during the forming operations to prevent undesired deformation.

An object of the present invention is to provide an improved machine and parts thereof for forming closure caps with a die action.

Another object of the invention is to provide a machine utilizing die members in forming closures which is simple in construction and rapid in operation.

Another object of the invention is to provide improved devices for forming the threads in the closures in such machines.

Another object of the invention is to provide improved means for supporting the skirt of the blank during the formation of the beaded edge.

Another object of the invention is to simplify the presentation of the blanks to the tools.

Another object of the invention is to provide improved means for forming vertical ribs in the closure at the time the thread is formed.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein.

Figure 1:
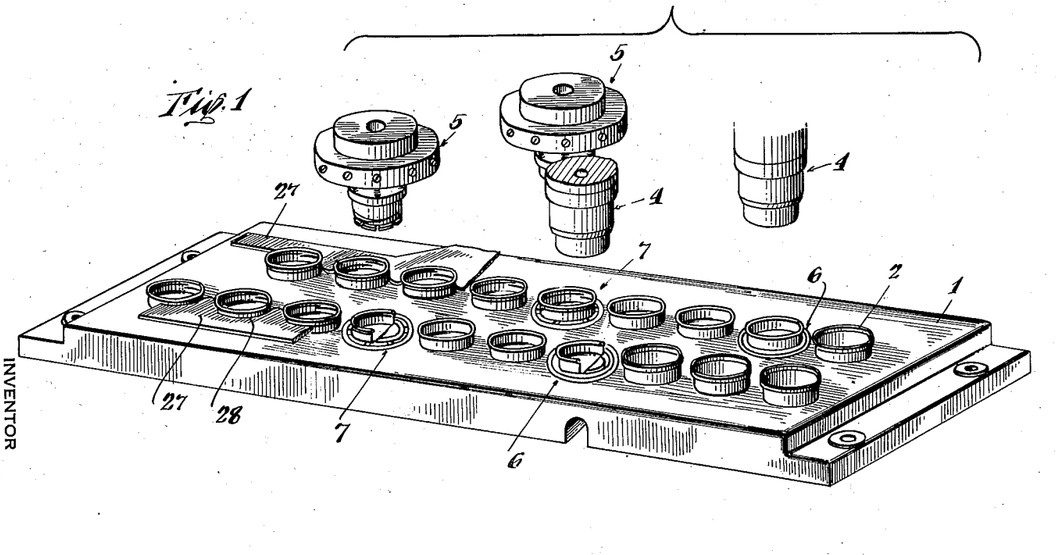
Fig. 1 is a diagrammatic view illustrating the closures moving under the tools effective thereon.
Figure 2A:
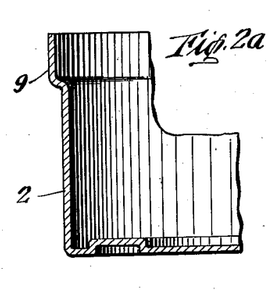
Fig. 2a is a fragmentary sectional view of the closure blank as it enters the machine.
Figures 2B, 2C:
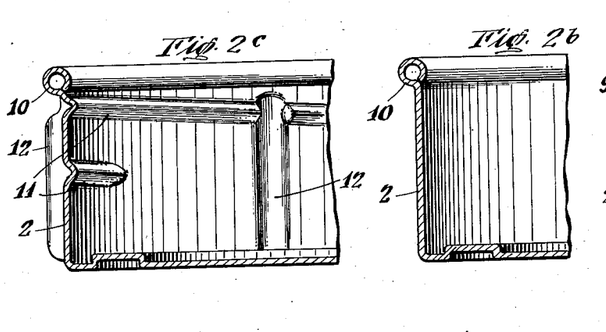
Fig. 2b is a fragmentary sectional view of the closure as it leaves the beading tool.
Fig. 2c is a fragmentary sectional view of the finished closure as it leaves the tool for forming threads and ribs therein.
Figure 2D:
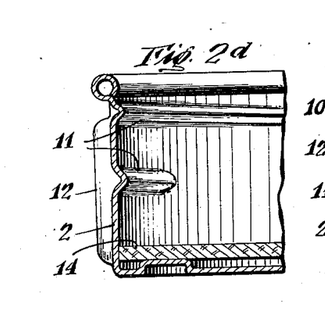
Fig. 2d illustrates the finished closure with a liner therein as it leaves the machine.
Figure 3:
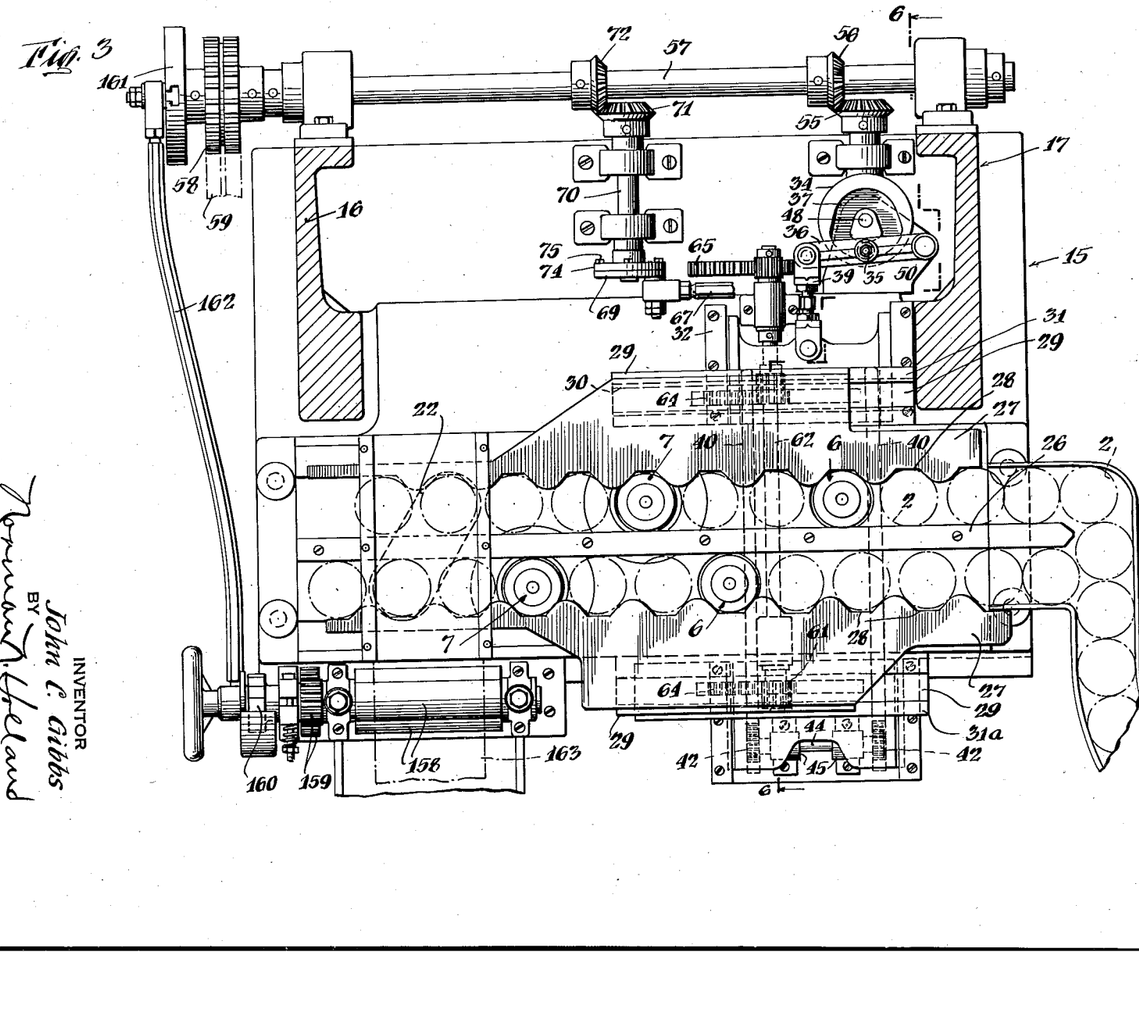
Fig. 3 is a sectional view on the line 3—3 of Fig. 5 illustrating the movement of the caps through the machine and the operation of the cap conveying mechanism.

Referring again to the drawings wherein a preferred embodiment of the machine is illustrated and more particularly to Figs. 1 to 3 thereof, the machine may be generally described as comprising a table 1 on which a pair of rows of cap blanks 2 are moved step by step under the tools 4 and 5. The tools 4, in cooperation with tools 6 (Figs. 7 and 8) within the table, curl the lower edge of the cap inwardly as shown more particularly in Fig. 2b. The blanks, as they enter the machine, are illustrated in Fig. 2a and are cup-shaped with the lower part or zone of the skirt flared or spaced outwardly as shown at 9 from which the inturned bead 10 is formed. As the caps continue their movement they pass under the thread and rib forming tools 5 which cooperate with tools 7 (Figs. 9 and 10) within the table to produce a continuous thread 11 extending about the skirt of the cap, interrupted at intervals by outwardly projecting vertical ribs 12, as illustrated more particularly in Fig. 2c. Thereafter the caps are moved past a lining device (not shown in Fig. 1) where a disc liner 14 is cut from a strip of cardboard and inserted in the cap in the position shown in Fig. 2d. The closures illustrated in Figs. 2c and 2d are identical except for addition of the liner in the latter figure.

The above general description is given so that the following description will be more easily understood. For convenience the general framework of the machine will be described first and then the mechanism for presenting the caps to the forming mechanism, the curling tools, the thread and rib forming tools and the other general features of the machine will be described in the order named.

Figure 4:
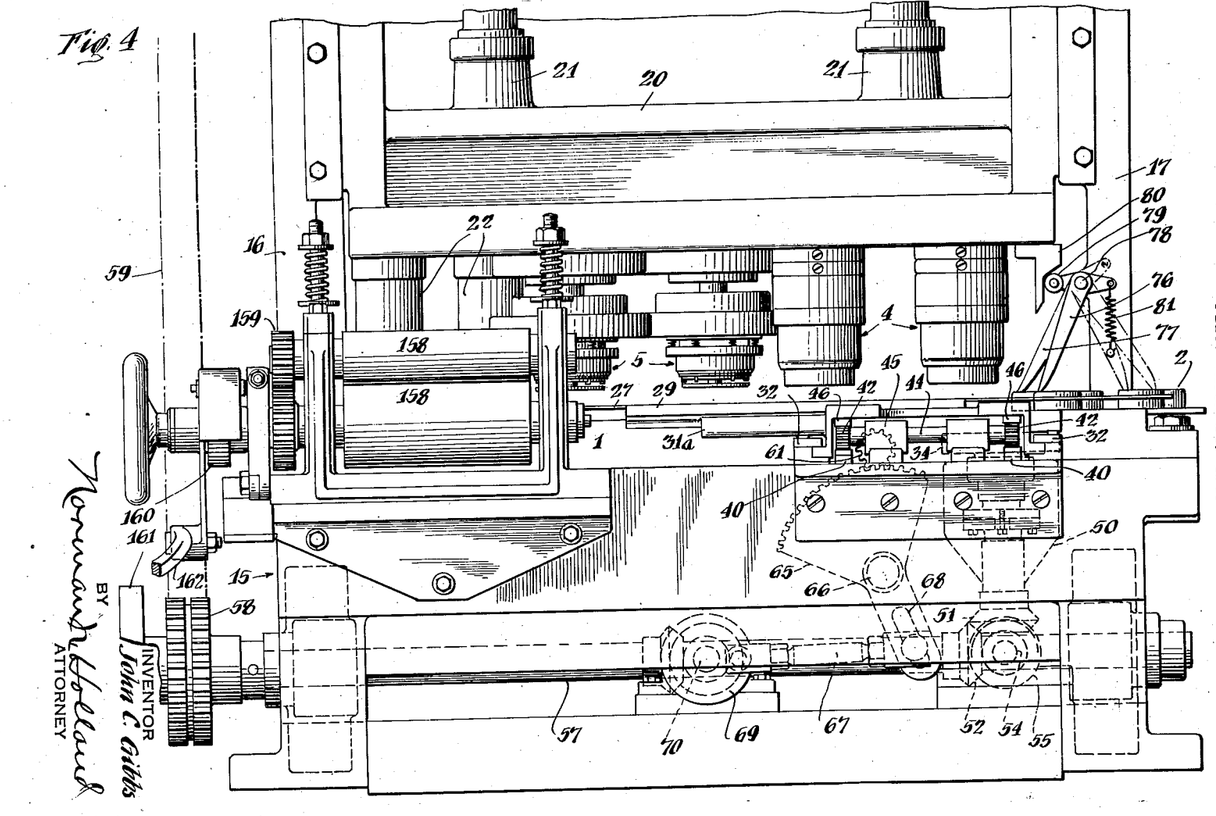
Fig. 4 is a front elevational view of the machine.
Figure 5:
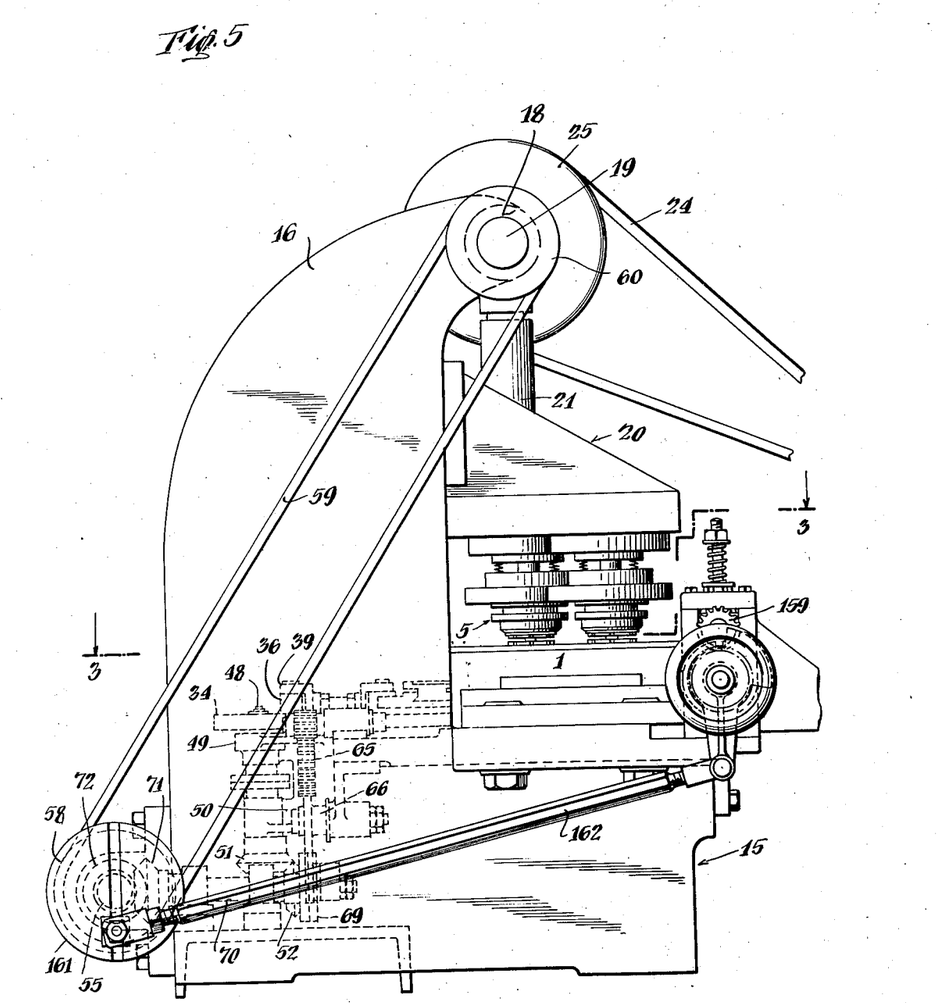
Fig. 5 is an end elevational view of the machine.

Referring more particularly to Figs. 3, 4 and 5 of the drawings, the machine is illustrated as having a frame 15 comprising supporting columns at the respective sides thereof suitably braced to form a rigid support. The table 1 is mounted on the framework and extending upwardly therefrom are the side members 16 and 17 having bearings 18 formed in the upper ends thereof for a shaft 19, having suitable cranks or eccentrics (not shown) for raising and lowering the press 20 by means of the supporting rods 21. The curling tools 4, the thread and rib forming tools 5 and the liner cutting and inserting tool 22 are mounted thereon and reciprocated in a vertical direction as the machine is driven by belt 24 on pulley 25 connected to a suitable source of power.

Figure 6:
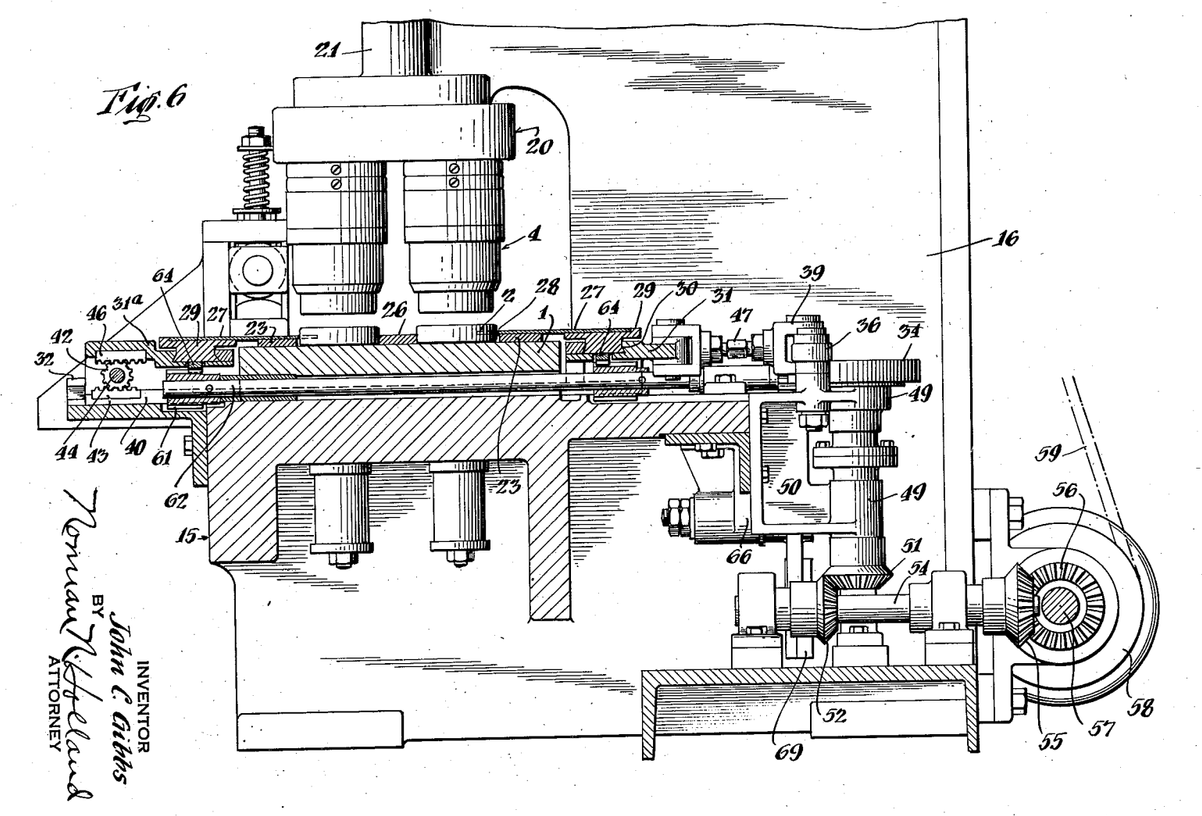
Fig. 6 is a sectional view along the line 6—6 of Fig. 3 illustrating the drive for and the movement of the cap positioning and moving mechanism.

The mechanism for presenting and positioning the closure caps to the respective tools is illustrated more particularly in Figs. 3 to 6. Referring more particularly to Figs. 3 and 6 there is shown a longitudinal guide member 26 extending between the two rows of caps and separating them and guide members 23 spaced to engage the outer sides of the caps. On the outer sides of the rows of caps is a pair of members 27 having recesses 28 therein adapted to receive the caps. The recesses are shaped to fit snugly against the sides of the cap and to hold them in cooperation with the members 23 and 26 in a definite position. It will be noted that the caps are engaged at three points, which definitely fix their position. The recessed members 27 move the caps forward so that each forward cap replaces the one ahead of it and is in turn replaced by the one behind it. To obtain this step by step movement, the members 27 are given a movement which is the component of a lateral movement inward and outward sufficiently far to disengage the closures and to engage and position them and are given a longitudinal movement one step forward while in engagement with the caps and one step backward when out of engagement with the caps.

This movement is achieved by mounting the members 27 on a carrier 29 (Fig. 6) free to slide longitudinally in the guideways 30 of members 31 and 31a. The members 31 and 31a are free to slide laterally in the guideways 32 and the member 31 is moved laterally by a grooved cam 34 through the intermediation of cam roller 35, pivoted lever 36 carrying the cam roller 35 and the adjustable link or rod 39. A similar lateral movement is given to the corresponding member 31a by extending a pair of rod and rack members 40 from the member 31 under the table 1 to mesh with gears 42 (Figs. 3 and 6) of the shaft 44 mounted in bearings 45. The gears 42 also mesh with racks 46 attached to the member 31a as shown more particularly in Fig. 6. Thus when the cam 34 rotates the groove 37 therein oscillates the pivoted lever 36, the link 39 and the member 31 to and from the closures moving through the machine. This movement is communicated to the member 31 on the opposite side of the machine through the rods 40, racks 43, gear 42, and racks 46 on the member 31a. The amount of the movement can be adjusted by nut 47 on rod 39 to increase or decrease the amount of lateral movement. For different sizes of caps, suitable plates 27 can be substituted and adjustments made to accommodate the lateral movement thereof.

The drive for the cam 34 and for the lateral movement of the members 27 is shown more particularly in Figs. 3 and 6. Referring to Fig. 6, the cam 34 is mounted on a vertical shaft 48 which passes through bearings 49 of a bracket 50 bolted to the machine framework. The lower end of the shaft 48 has a beveled gear 51 meshing with a beveled gear 52 on a shaft 54. The beveled gear 55 on the end of shaft 54 meshes with the beveled gear 56 on shaft 57 which extends along the back of the machine as shown in Fig. 3 and is driven by a pulley 58 and belt 59 extending about the pulley 60 on the main drive shaft 19 of the machine.

The longitudinal reciprocating movement of the carriers 27 is obtained by means of the gears 61 on shaft 62 (Figs. 3 and 6). These gears mesh with racks 64 secured to the bottom of the members 29. By oscillating the shaft 62 back and forth, the longitudinal reciprocating motion of the cap engaging members 27 is obtained. This movement does not interfere with the lateral movement and can be made in part at the same time by reason of the fact that the gears 61 are sufficiently wide so that the rack 64 may move a substantial distance laterally while still in engagement with the gears. This will be clear from the sectional view in Fig. 6.

The oscillating movement of shaft 62 may be provided in any suitable manner, but as illustrated herein it is obtained by means of a fragmentary gear 65, pivoted to the framework of the machine at 66 (Fig. 4) with a rod 67 secured in a slot 68 at one end thereof and eccentrically attached at the other end thereof to a disc 69 on shaft 70 (Fig. 3), having a beveled gear 71 meshing with a beveled gear 72 on shaft 57. The slot 68 in the depending arm of the fragmentary gear 65 permits the rod 67 to be adjustably connected thereto for varying the stroke of the longitudinal movement so that different sized caps may be made on the same machine. A further adjustment is provided by utilizing slots in the disc 74 in which the fastening bolts 75 are secured. This latter adjustment is ordinarily used for centering the caps for the respective tools. However, either adjustment may be used for any purpose desired.

The cap blanks are fed to the machine by suitable conveyors and are held in position in front of the members 27 by any suitable devices. In the preferred embodiment the caps are fed one cap at a time into each row by means of the cap feeding devices 76 and 77 (Fig. 4) which are pivotally mounted on the framework of the machine at 78. Cam rollers 79 are engaged by the projections or cams 80 attached to the movable part of the press. Thus during each downward movement of the press, the members 76 and 77 are moved outwardly into their dotted line position. As the press moves upwardly a spring 81 returns the fingers or feeding members 76 and 77 to their normal position bringing with them a cap blank for each of the rows.

Figures 7, 8:
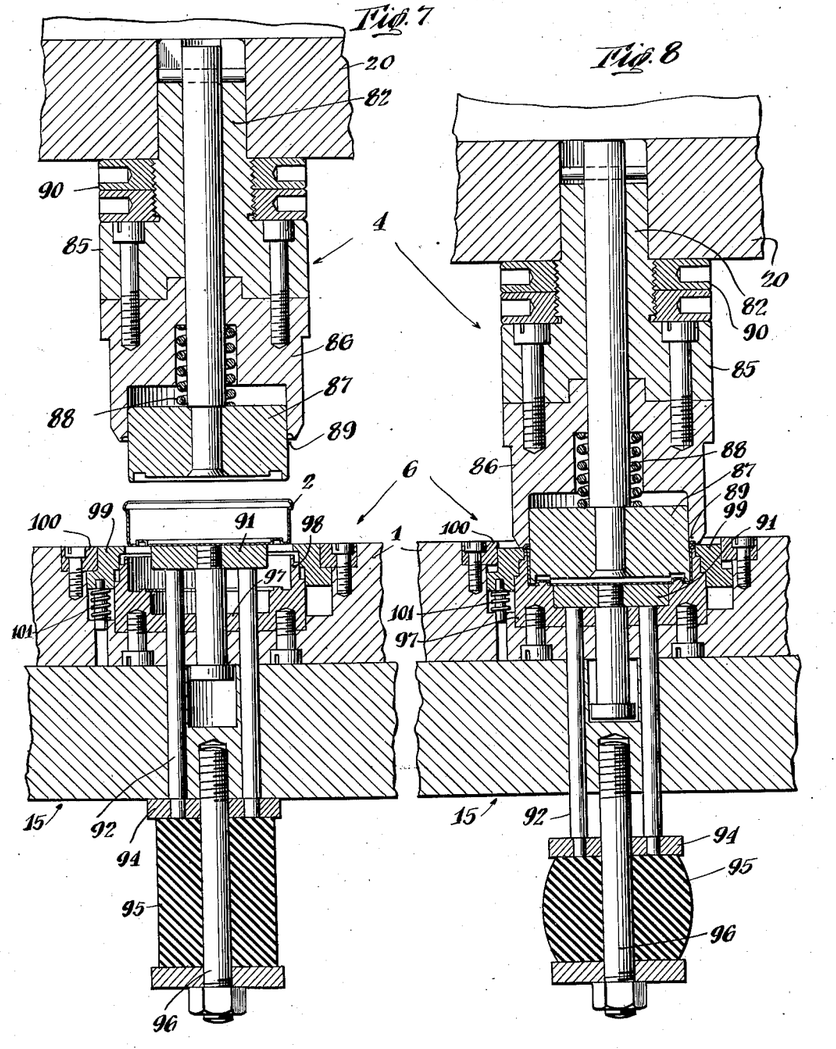
Fig. 7 is a sectional view through the mechanism for curling and beading the bottom edge of the cap.
Fig. 8 is a sectional view through the curling mechanism similar to the view in Fig. 7 at the completion of the curling operation.

The mechanism 4 for forming the inturned curled edge on the bottom of the cap, as shown in Fig. 2b, is illustrated in detail in Figs. 7 and 8, and its position in the machine is indicated in Figs. 1 and 4. Both of the tools 4 are identical and a description of one will suffice. The tool may be generally described as comprising two parts, the upper part, attached to the press, and the lower part 6, mounted within the table 1. Referring to the upper part, a member 82 is secured to the press 20 and has a flanged lower end 85 bolted to a curling member 86 which turns inwardly the lower edge of the skirt of the cap. The member 86 is recessed to receive a member 87, resiliently retained in its outer position by means of a spring 88 and adapted to fit snugly within the skirt of a cap. The outer cylindrical periphery of the member 87 supports the inside of the skirt of the cap while the curling groove 89 at the bottom of the member 86 curls inwardly the edge of the cap. In this way the size of the beaded edge may be controlled. The position of the curling member 86 with respect to the press may be adjusted by means of the nuts 90.

The lower part 6 of the tool is primarily adapted to support the exterior of the cap during the curling operation. A recess is formed in the table and a central supporting member 91 is retained flush with the upper side of the table by means of pins 92 held in their upper position by a plate 94 and a rubber sleeve 95 held in position by a bolt 96. A cup-shaped member 97 is bolted in position beneath the resiliently mounted support 91 having sides 98 adapted to fit snugly about the skirt of the cap. A solid ring 99 is mounted about the upper end of the cup-shaped member 97 and is held in position by a ring 100 bolted in position on the table. The ring 99 is resiliently held in its upper position by means of springs 101.

With a cap blank 2 in position on the resiliently mounted support 91 as shown in Fig. 7, the upper member is moved downwardly as shown in Fig. 8. The inner supporting member 87 enters the cap forcing it and the resiliently mounted member 91 downward until the support 91 reaches its lowermost position. Further movement of the upper member causes the curling member 86 to move downwardly in opposition to the spring 88 to depress the solid ring 99 in the lower member and to curl inwardly the edge of the closure by means of the curling groove 89. The solid ring 99 forms a lateral abutment in engagement with the lower edge of the curling member 86 so that the curled portion cannot spread outwardly but must turn inwardly and curl into the confined space. The upper rim of the cup-shaped member engages beneath the outwardly flared bottom portion of the cap and prevents downward movement of this part during the curling operation. The outer cup-shaped member 98 supports the outer side of the cap and the inner member 87 supports the inner side of the cap so that the metal is supported at all points during the curling operation.

The blank with the curled edge is now ready to have vertical ribs and a screw thread or other container engaging means formed therein. The tool for accomplishing this result is shown more particularly in Figs. 9 and 10, additional detailed features being shown in Figs. 11 to 15.

Figures 9, 11:
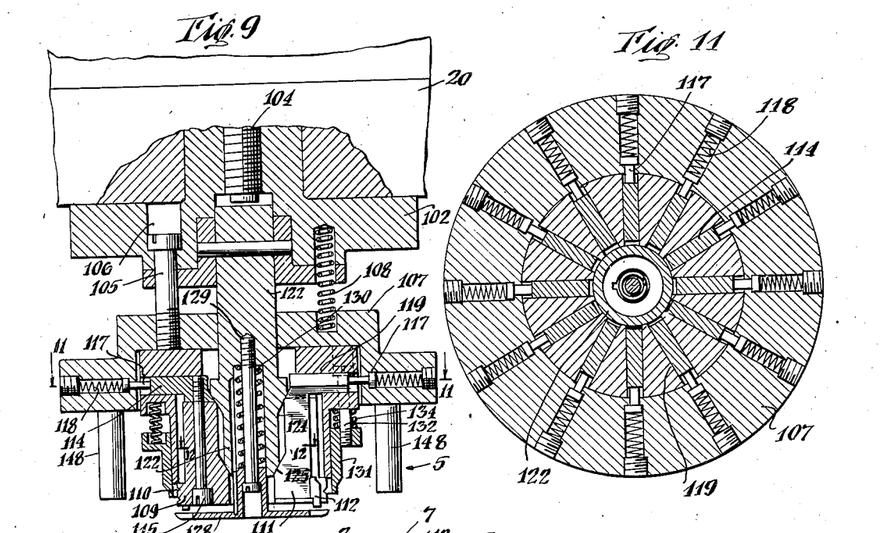
Fig. 9 is a sectional view of the tools for forming the thread and ribs of the cap.
Fig. 11 is a sectional view along the line 11—11 of Fig. 9, illustrating the resilient means for holding the expandable tool in contracted position.
Figure 10:
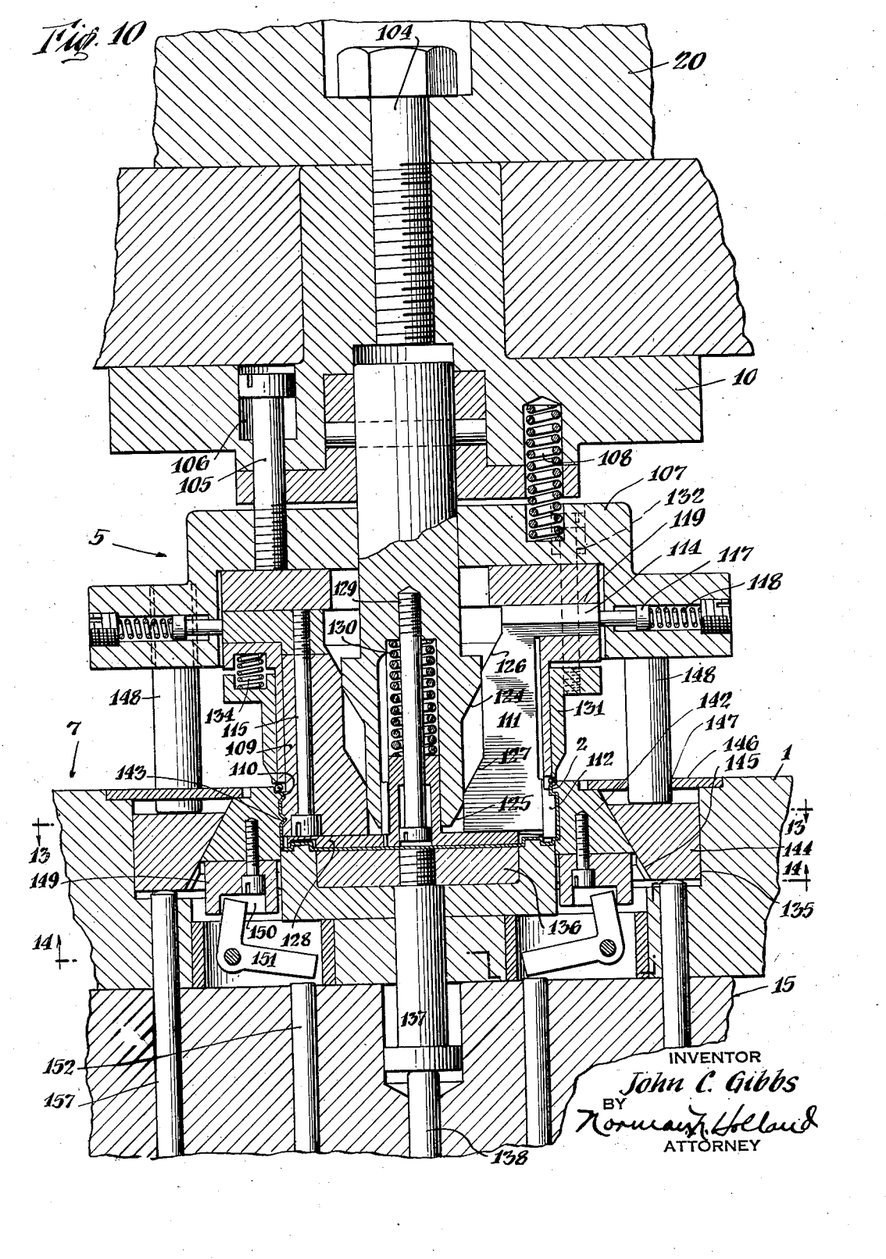
Fig. 10 is a sectional view through the thread and rib forming tool shown in Fig. 9, at the completion of the operation.
Figure 12:
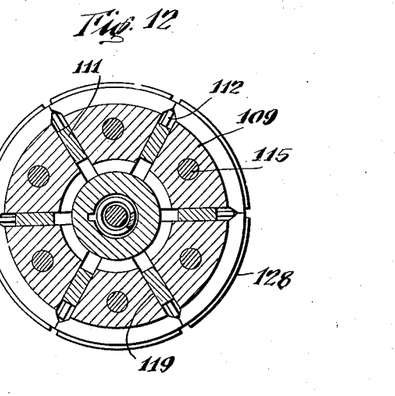
Fig. 12 is a sectional view along the line 12—12 of Fig. 9 illustrating the section and intermediate members.

Referring more particularly to Figs. 9 and 10, the tool comprises two parts, the upper expandible member which reciprocates vertically and fits into the skirt of the cap and the lower contractable member which is mounted in the table 1. The upper member has a flanged part 102 secured by a bolt 104 in the press 20. Suitable bolts 105 are mounted in the recesses 106 of the flanges of the member 102 and are secured at their lower ends to a cup-shaped member 107. Suitable springs 108 retain the cup-shaped member resiliently in its lowermost position. The collapsible part of the upper member 5 is formed by a series of segments 109 here shown as six in number with thread grooves 110 on their outer periphery. Intermediate these segments are a series of intermediate members 111 having rib forming surfaces 112 thereon. It is desirable that these segments and intermediate members be held in collapsed position. For this purpose and to secure the parts movably in place, laterally extending members 114 are bolted by means of bolts 115 to the upper ends of the thread forming members. The bolted parts 114 together with the thread forming part forms substantially an L-shaped member as shown in Figs. 9 and 10 with the L projecting outwardly. A pin 117 is resiliently pressed by a spring 118 against the ends of the members 114 to retain the segment members in collapsed position. The intermediate members are preferably made in one piece and are also somewhat L-shaped with laterally extending upper ends which project outwardly into recesses 119 where they are engaged by pins 117 resiliently held in position by springs 118. The sectional view shown in Fig. 11 taken along the line 11—11 of Fig. 9 illustrates the operation of the springs in keeping the parts in collapsed position. The sectional view in Fig. 12 along the line 12—12 of Fig. 9 illustrates the relation of the collapsible segments and intermediate members at a plane substantially below that of the springs. Normally the upper part of the tool member is held by the springs 118 in contracted position. When, however, the members are inserted within the cap and pressed downwardly as shown in Fig. 10, the central member 122 having the conical surfaces 124 and 125 is forced downwardly by reason of the fact that the cap, when its downward movement is stopped, forces the outer segment and intermediate members upwardly in opposition to the springs 108 so that the cam surfaces 124 and 125 slide over the cam surfaces 126 and 127 of the intermediate and the segment members so that they are forced apart. The straight or parallel portions intermediate the cam surfaces 124 and 125 and the straight or parallel portions above the cam portions 124 cooperate with portions on the sectional and intermediate members to determine the maximum expansion of the expandible members. In the preferred embodiment the straight or parallel portions have outer surfaces conforming substantially to the outer surface of a cylinder. The rib members 112 form vertical ribs in the closure and the groove surface 110 is in position on the inside of the skirt of the cap for the formation of the spiral thread. The upper member has a resiliently mounted presser plate 128 held in its downward position by means of a bolt 129 and a spring 130. A resiliently mounted sleeve 131 held in position by the bolts 132 and springs 134 engaged with the upper side of the beaded edge of the cap during the formation of the thread.

Figures 13, 14, 15:
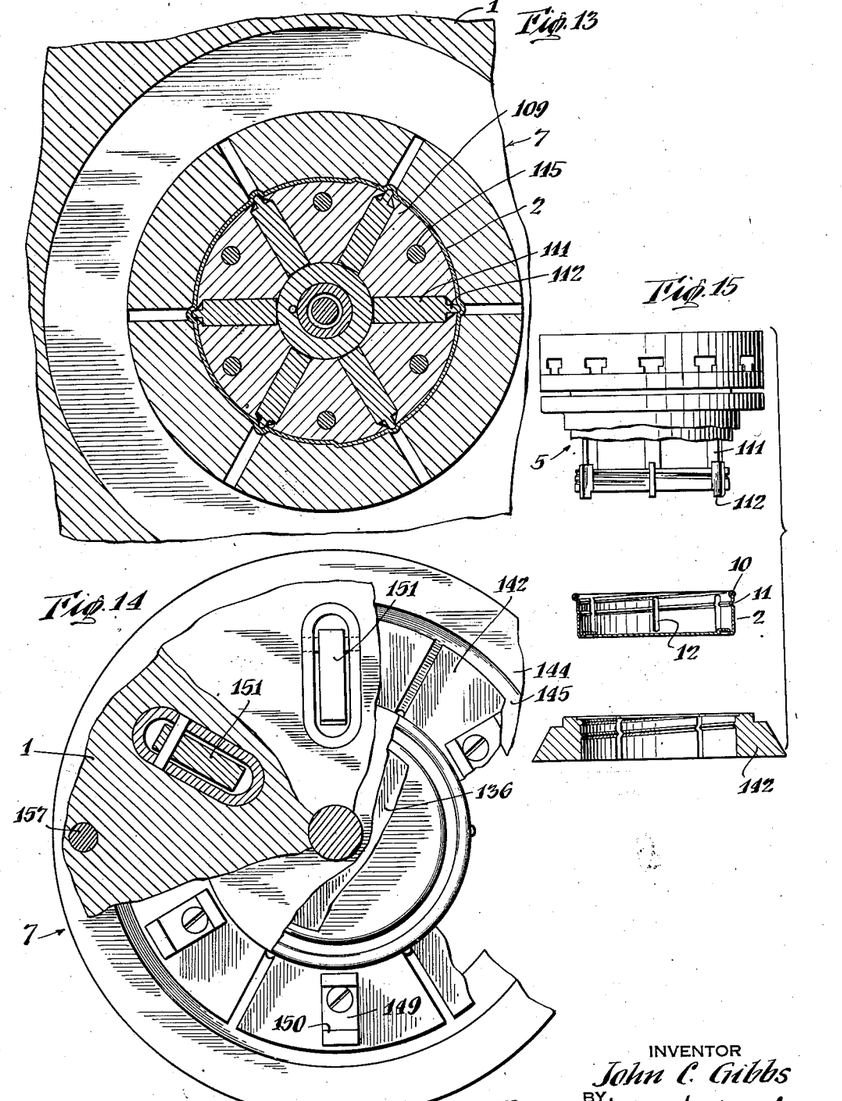
Fig. 13 is a sectional view along the line 13—13 of Fig. 10, illustrating the parts of the contractable members.
Fig. 14 is a sectional view along the line 14—14 of Fig. 10 illustrating the parts for holding the contractible member in expanded position.
Fig. 15 is an exploded diagrammatic sectional view illustrating the operative parts for forming threads and ribs in the closures.

The lower collapsible thread forming mechanism is mounted in a recess 135 of the table 1 and comprises a supporting member 136 substantially flush with the surface of the table for supporting the blank. The supporting member 136 is held in its upper position by a bolt 137 and permitted to move downwardly by means of a pin 138 resiliently retained in its upper position by a spring 139 in the housing 140. Extending about the support 136 are collapsible members 142 rigidly supported to slide inwardly and outwardly to and from the skirt of the cap. Any number of sections of the ring may be utilized but as shown herein, there are six. A solid ring 144 extends about the section ring and has an inclined surface 145 engaging a similar inclined surface on the segments of the inner collapsible ring. Both the collapsible ring and the solid ring are held in position by a circular plate 146 having apertures 147 in the upper surface thereof through which pins 148 depending from the upper member pass to force the solid ring down and to collapse the inner ring segments 142 about the skirt of the cap. The ring segments have bolted thereon brackets 149 with slots 150 therein (Figs. 9, 10 and 14). Pivoted bell cranks 151 have one end in the recesses 150 and the other in engagement with pins 152 extending downwardly through the table and attached to a plate 154. The plate is maintained in its upper position and the ring segments 142 in their outer expanded position by means of a rubber sleeve 155 extending about the housing 140 and held in position by nut 156 which may be adjusted up or down in position to increase or decrease the effect of the rubber sleeve 155. The solid ring 144 is likewise resiliently retained in its upper position by pins 157 attached to the plate 154.

As the upper member is moved downwardly the pressure plate 128 engages the bottom of the cap and forces it together with the resilient support 136 downwardly until the cap is in line with the collapsible segments 142 having threading surfaces 143 thereon. At that point, the inner cam member 122 of the upper member moves the expandible segments and the intermediate members outwardly by the engagement of the cam surfaces 124 and 125 thereon with the cam surfaces 126 and 127 on the expandible members. Simultaneously the depending pins 148 pass through apertures in the ring plate 146 moving the solid ring downwardly and thereby causing the cam surfaces 145 to slide on the corresponding cam surface of the collapsible section ring and to force the sections inwardly against the skirt of the cap. The thread projections 143 on the outer collapsible member and the thread grooves 110 on the inner expandible member register with each other and form a thread which is identical for each cap because the tool is identical in each case and the movement of the parts can be regulated to produce the same results in all instances. Simultaneously with the formation of the thread, the intermediate rib members of the upper tool member move outwardly and form ribs at the termination of the sections of the upper member. This facilitates formation of the thread grooves and also strengthens the cap in a vertical direction. The ribs have a further advantage of facilitating gripping the cap during application and removal and of eliminating the necessity for the usual unsightly knurls at the upper part of the cap. It will be noted in Fig. 10 that in the final rib and thread forming position, the cap is supported at all points and hence the cap cannot collapse in any direction. When the press 20 raises the upper tool, the parts of both the upper and lower tools return to their normal positions as shown in Fig. 9 with the top of the resilient support 136 flush with the table 1.

The caps are now completed except for the insertion of a liner or other sealing medium. This can be done automatically in a third step illustrated more particularly in Figs. 3, 4 and 5 of the drawings. A strip of cardboard or other sealing material is threaded through the rollers 158 which are driven by intermeshing gears 159 thereon which in turn are driven by a ratchet 160 through the intermediation of the eccentric 161 on shaft 57 and the eccentric rod 162. The strip of cardboard 163 is fed forward a distance sufficient to permit dies to cut out a disc for a cap in each of the rows and to force the disc into the cap. The ratchet feed for the strip advances it during the next movement of the press so that additional discs may be cut out. It is not necessary to describe in detail the specific feed for the strips or the cutting dies as any suitable form may be utilized.

In the operation of the machine, closure cap blanks similar to those shown in Fig. 2a are presented adjacent the end of the table 1 and are fed in double line by means of the feeding fingers 76 and 77 (Fig. 4), which are moved into their dotted position with each downward movement of the press and are allowed under the influence of springs to bring forward a cap blank in each row during the upper movement of the press. The two rows of caps pass adjacent to and on the opposite sides of the center guide member 26 and between the outer guide members 23 so that they are guided in a straight line. Superimposed on the guide members 23 are the members 27 having recesses 28 therein adapted to fit about caps and to move them forward in a step by step movement. The cap advancing members 27 are given a combined lateral oscillatory motion and a longitudinal reciprocatory motion which combines to engage the caps, move them forward one step and thereafter release the caps, move backwards and engage the caps again for a further movement of the rows of caps. The lateral oscillating motion is obtained from the shaft 57 (Fig. 6) through beveled gears 55 and 56, shaft 54 bevel gears 52 and 51, shaft 48, cam roller 35 fitting in the groove 37 thereof and attached to the member 31 which is mounted in guideways 32. The member 31a on the opposite side of the machine is connected by means of rods 39 (Figs. 3 and 6) having racks 43 on their ends meshing with gears 42 which in turn mesh with racks 46 on the member 31a. Thus the members 31 and 31a are interconnected so that the lateral movement imparted to one is automatically imparted to the other in the opposite direction.

The longitudinal reciprocatory motion is imparted to the members 27 from shaft 57 (Fig. 3) through beveled gear 72 thereon, beveled gear 71 on shaft 70, disc or crank 69, rod 67, attached at one end to the segmental rack 65 (Fig. 4) pivoted at 66 and meshing with the gear 61. In this manner the segmental rack 65 oscillates back and forth to rotate first in one direction and then in the opposite direction, the gears 61 and the shaft 62. The gears 61 are sufficiently wide so that they permit lateral motion without disengagement of the rack 64 as will be seen in Fig. 6.

The caps in their step by step movement are first presented to the curling tool (Figs. 7 and 8). The cap comes to rest on a resiliently mounted support 91 whereupon the upper curling die moves downward with the press 20, the center member 87 of the die fits into the skirt of the cap and moves the cap and resilient support 91 downwardly until it is completely enclosed by the member 97, and until the member 91 reaches its lower position. Whereupon the outer sleeve member 86 compresses the spring 88, engages and depresses the solid ring 99 and simultaneously curls the edge of the cap. It will be noted that the cap is supported interiorly and exteriorly during the beading operation. The press then raises the upper member whereupon the rubber sleeve 95 operative upon the supporting pins 92 for the support 91, raises the support until the cap is flush with the table 1.

The caps with the curled edges are then presented by the conveying members 37 to the thread and rib forming tool shown more particularly in Figs. 9 and 10. Again the cap is positioned on a resiliently mounted support 136 directly under the upper member of the tool which moves downwardly with the inner expandible member fitting within the skirt of the cap and forces the cap and the member 136 downwardly into the table. As the cap reaches its lowermost position, the inner expandible members are forced outwardly by means of the member 122 having cam surfaces 124 and 125 thereon engaging cam surfaces 126 and 127 on the expandible members. Simultaneously the pins 148 pass through apertures in the ring 146 and depress the solid ring member 144 causing the inclined surface 145 thereon to move against the inclined surface on the collapsible members 142 forcing their thread forming surfaces against the outer side of the skirt of the cap. The thread ribs 143 register with the thread grooves 110 on the inner member and press a thread into the cap. The rib forming members 112 simultaneously are forced outwardly to form vertical ribs in the skirt of the cap. When the press moves upwardly the inner members move out of the cap and the resilient support 136 moves the cap upwardly flush with the top of the table. The rubber sleeve 155 returns the parts of the lower member to their original position and the springs 108, 118, 130 and 134 return the parts of the upper member to their original positions.

The finished caps are then moved under the liner inserting mechanism where suitable liners, as shown in Fig. 2d, are inserted into the caps by means of dies which punch discs from the liner strip 163 (Fig. 3).

It will be seen that the present invention provides a simple and inexpensive machine which may be operated at a high speed to form threads in closure caps by means of collapsible tools. By eliminating the rolling operation the difficulties encountered in making accurate threads and in obtaining caps which will screw on and off with ease is eliminated. In rolling caps, due to various limitations inherent in the operation, it is not possible to maintain the accuracy which can be obtained by the present machine in which dies register with each other to form a thread of exactly the same slope and with the same uniformity in all cases. The construction of the machine is such that caps may be made without increase in the cost of labor as compared with rolling operations. The finished caps have a better appearance, not having been subjected to the rolling and scraping operations of spinning tools. The common difficulty occasioned in the removal of caps from jars is eliminated or greatly minimized by the accurate thread fit which may be obtained. A further distinct advantage of the invention is the fact that a thread may be formed in the cap in which the upper surface thereof is more nearly horizontal thereby giving a better grip or hold on the underside of the thread on the glass container. In addition, it has been found that the threads may be forced inwardly further by the present operation than is possible by means of rolling tools, thus giving a more secure grip on the thread of the container and a more secure seal. The machine is rugged in construction and fully capable of withstanding the rough usage to which it may be subjected without requiring stoppage for repairs and the like.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a device for the manufacture of closure caps, the combination of an expandible member for fitting into the skirt of a cap, a contractable member adapted to fit about the cap, means comprising members having tapered surfaces for expanding said expandible member against the inside of the skirt of the cap and having other surfaces conforming substantially to the outer surface of a cylinder for permitting additional relative movement of said members without additional expansion of said expandible member, said contractable member having means adapted to form container engaging means in the skirt of the cap, and resiliently operated devices for contracting said contractable member against the outside of the skirt of the cap to form container engaging means in the skirt of the cap.

2. In a device for the manufacture of closure caps, the combination of an expandible member for fitting into the skirt of the cap, a contractable member adapted to fit about the skirt of the cap, said expandible and contractable members having a spiral groove in one and a spiral tongue in the other adapted to form a spiral thread in the skirt of the cap, relatively movable inclined and parallel surfaces for expanding said expandible member to a diameter determined by the parallel surfaces accurately to fix the internal size of the closure, and resiliently mounted devices for contracting said contractable member against the outside of the skirt of the cap to form accurately sized container engaging means in the skirt of the cap through the intermediation of said spiral groove and tongue.

3. In a device for the manufacture of closure caps, the combination of an expandible member having a plurality of sections adapted to fit into the skirt of a cap, and a plurality of outwardly movable members intermediate said sections for forming vertical ribs in the skirt of the cap, a contractable member adapted to fit about the cap, means for expanding said expandible member against the inside of the skirt of the cap, said expandible and contractable members having surfaces adapted to form container engaging means in the skirt of the cap, devices for contracting said contractable member against the outside of the skirt of the cap to form container engaging means in the skirt of the cap, said expandible means being adapted to force outwardly said intermediate members to form vertical ribs in the skirt of the cap.

4. In an expandible device for the manufacture of closure caps, the combination of expandible members for fitting into the skirt of the cap, said members having a spiral groove on the outer surface thereof adapted to form a spiral thread in the skirt of the cap, expandible means intermediate the ends of said expandible members for forming vertical ribs in the skirt of the cap and mechanism including a member having conical surfaces adapted to engage said expandible members and said expandible means to move them outwardly against the skirt of the cap.

5. In a device for the manufacture of closure caps, the combination of a section member for fitting into the skirt of the cap, members intermediate the sections of said members, the outer surface of said section members having means for forming container engaging means in the skirt of the cap, said intermediate members having means thereon adapted to form vertical ribs in the skirt of the cap, and devices for expanding said section members against the skirt of the cap and for forcing said intermediate members outwardly against the skirt of the cap to form container engaging means and ribs therein.

6. In a device for the manufacture of closure caps, a member for fitting within the closure cap comprising a plurality of expandible section members having spiral threads on the outer surface thereof, radially movable members intermediate said section members adapted to form a vertical rib in the skirt of the closure, and an expansive member having conical surfaces adapted to engage said section members and said intermediate members at spaced points to move said members outwardly against the skirt of a cap.

7. In a device for the manufacture of closure caps, section members for fitting into the skirt of the cap and expandible for pressing against the inside of the skirt of the cap, said section members having screw threads on the exterior thereof for forming screw threads in a closure, expandible sections intermediate the threaded members for forming vertical ribs in a closure, resilient means effective upon said sections for holding them normally in contracted position and mechanism including a member having conical surfaces adapted to engage said expandible section members and said expandible sections at spaced points to move said members and sections outwardly against the skirt of the cap.

8. In a device for the manufacture of closure caps, the combination in a member for fitting into the skirt of the cap of a plurality of section members expandible within the skirt of the cap, the outer surfaces of said members having means thereon for forming screw threads in the closure, members intermediate said section members movable radially for forming vertical ribs in the closure cap, resilient means for holding said section members and said intermediate members in contracted position and a member having a cam surface thereon for moving said section members and said intermediate members outwardly into engagement with the skirt of the cap.

9. In a device for the manufacture of closure caps, a mechanism for engaging the outer surface of the closure cap, comprising in combination a plurality of contractable section members for fitting about the skirt of the cap, the inner surfaces of said section members having a spiral rib thereon for forming a spiral thread in the closure, the outer surfaces on said section members being substantially conical in shape, a solid ring extending about said section members having a conical surface adapted to engage the conical surfaces of the section members, said conical ring being adapted to be forced downwardly to force the section members inwardly toward the skirt of the cap, resilient means for normally retaining said section members in their expanded position and means operatively connecting said solid ring with said resilient means to render said resilient means ineffective when said solid ring is operated to contract said section members.

10. In a device for the manufacture of closure caps, the combination of an expandible device for fitting into the skirt of the cap, having members with a spiral groove on the outer surface thereof and intermediate members having vertical ribs on their outer surface, a contractable member adapted to fit about the outer surface of the closure cap having an inclined surface, a solid ring having an inclined inner surface for cooperating with said inclined outer surface and means for expanding said inner device to press radially outwardly against the skirt of the cap and to form vertical ribs therein, and means for operating said solid ring to contract said outer member and thereby form screw threads in the closure cap.

11. In a device for the manufacture of closure caps, the combination of an expandible member for fitting into the skirt of a cap, means for expanding said expandible member against the inside of the skirt of the cap, a contractable member fitting about the outside of the closure cap having inclined surfaces thereon, a solid ring having an inclined surface for engaging the inclined surfaces of the contractable member to contract said contractable member and a plurality of pins operatively connected to said expandible member for moving said ring relative to the contractable member to contract said contractable member.

12. In a device for the manufacture of closure caps, comprising in combination, a table, a resiliently mounted support normally flush with the table, a contractable member for fitting about the outside of a closure cap extending about said supporting member, a member adapted to engage and fit into a closure on the support and means for forcing said last mentioned member into the closure cap and forcing said cap and said resilient support downwardly until the cap is in line with said contractable member and for closing said contractable member about the closure to form container engaging means in the skirt of the cap.

13. In a device for the manufacture of closure caps, the combination of a member for fitting into the skirt of the closure cap, means resiliently mounted for supporting a closure cap under said member, a plurality of contractable section members fitting about said supporting means below the closure cap, a solid ring adapted upon downward movement to contract said contractable members, means for forcing said first mentioned member into said closure cap and for forcing said support downwardly until the cap is in line with said contractable members, and means operatively connected to said first mentioned member for forcing said solid ring downwardly to contract said contractable members.

14. In a device for the manufacture of closure caps, the combination of an expandible member for fitting into the skirt of the closure cap, means resiliently mounted for supporting a closure cap under said expandible member, a plurality of contractable section members fitting about said supporting means below the closure cap, a solid ring adapted upon downward movement to contract said contractable members, means for forcing said expandible member into said closure cap and for forcing said support downwardly until the cap is in line with said contractable members, means operatively connected to said expandible member for forcing said solid ring downwardly to contract said contractable members, and means for expanding said expandible members after it has entered the closure cap.

15. In a device for the manufacture of closure caps, comprising the combination of a resiliently mounted support for retaining a closure cap, an expandible member having a plurality of movable parts adapted to fit into said closure cap, said expandible member having a groove on the outer surface of said parts, members intermediate said parts of the expandible member having means on the outer surface thereof for forming vertical ribs in the closure cap, a core having a cam surface thereon for expanding said movable parts and said intermediate members, a plurality of contractable members mounted below said closure, a solid ring extending about said contractable members to force them inwardly upon downward movement of the ring, means for forcing said expandible member into the closure cap and continuing the movement thereof to force the support resiliently downwardly into the closure cap in alignment with said contractable member and simultaneously expanding the intermediate members and movable parts of said expandible member and contracting said contractable member for forming vertical ribs and container engaging means in the skirt of the cap.

16. In a machine for the manufacture of closure caps, the combination of a table, means for moving a plurality of closure caps along said table, a plurality of resiliently mounted supports in said table, said moving means being adapted to stop the closure caps on said supports, means for engaging and curling the closure cap on one of said resiliently mounted supports to force said support downwardly and curl the edge of the closure into a beaded edge and means for engaging the closure on another of said supports to force said closure and support downwardly and to form container engaging means in the skirt of the cap.

17. In a device for the manufacture of closure caps, comprising, in combination, a table, means for moving a plurality of closure caps along said table, said table having a plurality of resiliently mounted supports, said moving means being adapted to stop closures on said supports, curling means for engaging a closure on a support and for forcing the support downwardly until the upper edge of the closure is flush with the table, with the sides of the closure supported by means within the table, for forming a beaded edge on the closure, expandible means for engaging another closure on another support to force the closure and support downwardly within the table, contractable means extending about the closure in its downward position, means for expanding said expandible means and for contracting said contractable means to form container engaging means in the skirt of the closure.

18. In a machine of the class described, the combination of a resiliently mounted support for a closure cap, a curling tool for engaging and forming a curled edge on a blank having an enlarged zone at its free edge, a cup-shaped member extending about said resiliently mounted support, means for forcing said curling tool against said closure cap to force the cap and the resilient support therefor down into said cup-shaped member until the enlarged zone is supported in a vertical direction by said cup-shaped member to prevent undesired deformation thereof during the curling operation.

19. In a machine of the class described, the combination of a guideway for a row of closure caps, an elongated member having recesses adapted to accommodate the caps in said row, rack means for moving said elongated member into and out of engagement with said row of caps and gear means for moving said elongated members forward while in engagement with the closures and backward while out of engagement with the closures to move the closures forward in a step by step movement and to present them to a cap forming tool and a cap forming tool having members with cooperating threads and grooves for forming screw threads in the closure.

20. In a machine of the class described, the combination of a table, guideways for a pair of rows of caps on said table, resiliently mounted supporting means for caps in said table, substantially flush with the surface of the table, a pair of elongated members adapted to engage said rows of caps respectively, means for moving said elongated members into and out of engagement with the closure caps and means for moving said elongated members forward while in engagement with the closure caps and backward while out of engagement with the closure caps to move the closures forward in a step by step movement and to present the closures successively to the supporting means and forming tools comprising an expandible inner member and a contractable outer member cooperating with the supporting means to force said closures and the resiliently mounted supporting means downwardly into the table and to form screw threads in the closures.

21. In a machine of the class described, the combination of a guideway for a row of closure caps, resiliently mounted supporting means for said closures in said guideway, the upper surface of said supporting means being substantially flush with the bottom of the guideway, an elongated member having recesses adapted to accommodate the caps in said row, means for moving said elongated member into and out of engagement with said row of caps, means for moving said elongated member forward while in engagement with the closures and backward while out of engagement with the closures to move the closures forward in a step by step movement to present them to a cap forming tool, and a cap forming device having an expandible inner member adapted to engage a closure on said resiliently mounted supporting means to depress the closure and the supporting means and having a collapsible outer member adapted to cooperate with said inner member for forming screw threads in the closure.

22. In a device of the class described, the combination of guideways for a pair of rows of closures, resiliently mounted supporting means for said closures in said guideways, the upper surfaces of said supporting means being substantially flush with the bottoms of the guideways, a pair of elongated members for engaging one side respectively of each of said rows of closures, rack means for moving said elongated members into and out of engagement with said rows of closures, gear means for moving said elongated members forward while in engagement with the closures and backward while out of engagement with the closures to move the rows of caps forward and to present them to thread forming devices, thread forming devices comprising an expandible member adapted to engage a closure on said resiliently mounted supporting means to depress the closure and the supporting means and a contractable member adapted to cooperate with the expandible member for forming screw threads in the presented closure caps and means for operating said expandible and contractable members.

23. In a machine of the class described, the combination of a table, a guide for a row of closure caps on said table, an elongated member having a series of recesses therein for engaging one side of the caps in the row, means for moving said elongated member outwardly out of engagement with the closures and inwardly into engagement with the closures, means for reciprocating said elongated member along its longitudinal axis, whereby the closures are moved forward in a step by step movement, means for engaging the closures and forming an inturned wire edge thereon, and means comprising an expandible inner member and a contractable outer member for engaging a closure and forming screw threads therein.

JOHN C. GIBBS.